United States Patent [19]

Kranz

[11] 4,072,298

[45] Feb. 7, 1978

[54] METHOD OF COOLING A QUENCHING BATH OF MELTED SALT

[75] Inventor: Berthold Kranz, Duren, Germany

[73] Assignee: Firma Carl Canzler, Duren, Germany

[21] Appl. No.: 593,256

[22] Filed: July 7, 1975

[30] Foreign Application Priority Data

July 12, 1974 Germany .............................. 2433539

[51] Int. Cl.² ............................................ G05D 23/13
[52] U.S. Cl. ........................................ 266/44; 148/15; 266/112
[58] Field of Search ...................... 148/15, 12 B, 12.4; 266/107, 112, 131, 44

[56] References Cited

U.S. PATENT DOCUMENTS

| | | | |
|---|---|---|---|
| 2,052,254 | 8/1936 | Shaver | 266/131 |
| 2,537,830 | 1/1951 | Holden | 148/15 |
| 2,931,745 | 4/1960 | Halgren et al. | 148/28 |
| 3,645,802 | 2/1972 | Keough | 148/15 |
| 3,915,759 | 10/1975 | Smollett | 148/15 |

OTHER PUBLICATIONS

"Water in Molten Salt Measures Quenching Power Lowers Operating Temperature", Case et al., Metal Progress, Oct. 1953, pp. 122-124.

Primary Examiner—Arthur J. Steiner
Attorney, Agent, or Firm—Joseph A. Geiger

[57] ABSTRACT

A method of cooling a heat treatment bath of melted salt into which heat is being introduced through the quenching of hot workpieces, the heat being removed from the salt bath through the introduction of a partially evaporated cooling medium, preferably water, whose complete evaporation takes place in direct contact with the melted salt, a portion of the latter being at the same time entrained in a circulatory flow out of the treatment tank and back into it, thereby agitating the salt bath for temperature equalization. The device includes a heat exchanger immersed in the salt bath for the partial evaporation of the cooling medium, and a circulation pipe for direct contact of the cooling medium with the melted salt.

5 Claims, 2 Drawing Figures

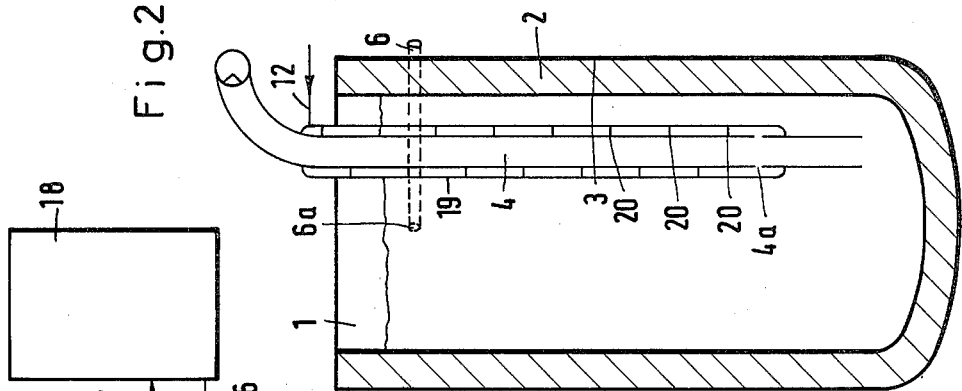
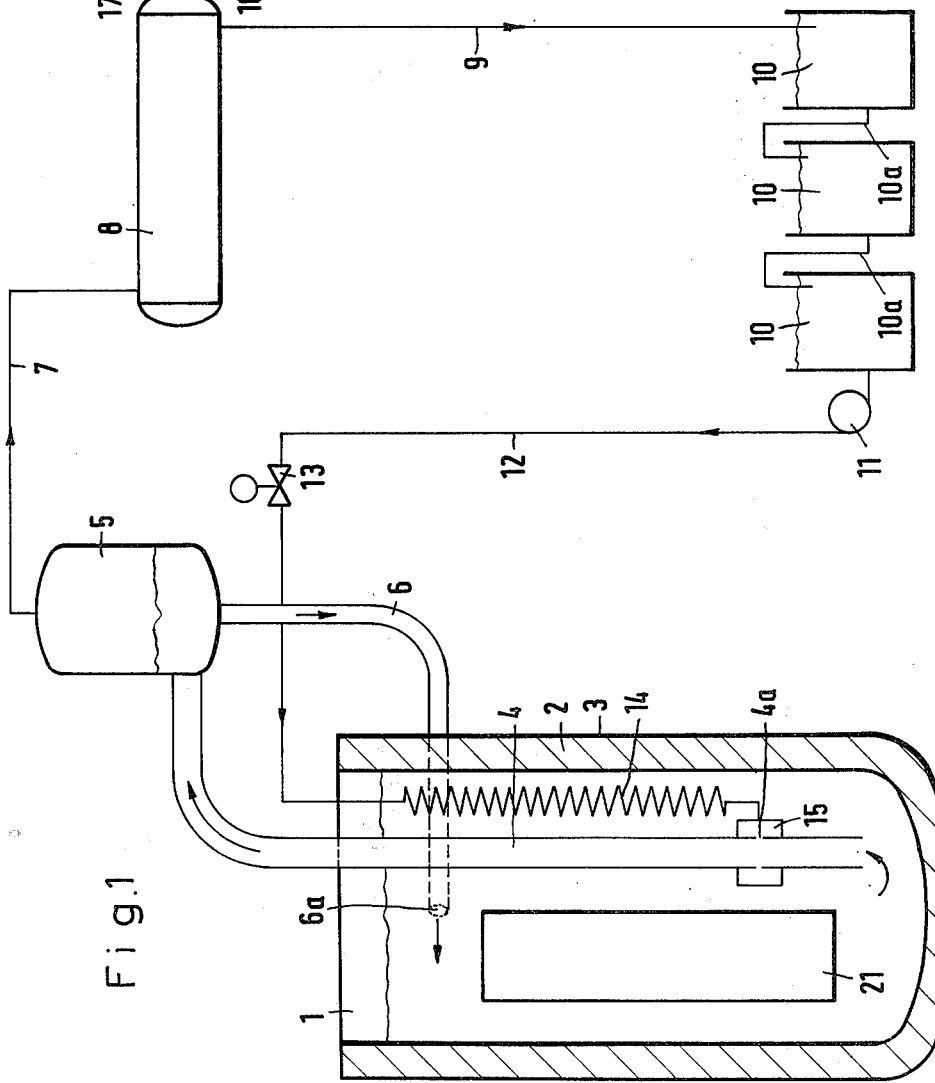

METHOD OF COOLING A QUENCHING BATH OF MELTED SALT

BACKGROUND OF THE INVENTION

1. Field of the Invention

The present invention relates to a method of cooling a heat treatment bath, such as a salt bath in which hot workpieces are quenched in regular succession or at random intervals.

2. Description of the Prior Art

The idea of using a salt bath for the heat treatment of workpieces, which are to be quenched in regular succession or at varying intervals, using a bath temperature somewhere within the range of 400° to 550° C, is known from the prior art in this field. In order to achieve certain specific material characteristics of the workpieces treated, it is necessary to maintain the temperature of such a salt bath at a predetermined value within the aforementioned temperature range. In the case where such a salt bath is used to heat workpieces to be treated, the maintenance of a given temperature of the salt bath requires the addition of heat to the bath to keep it at the desired temperature level. If, on the other hand, the workpieces which are introduced into the salt bath are hot, having a temperature which is higher than the prescribed temperature of the salt bath, a corresponding removal of heat, by controlled cooling of the bath, will be necessary.

The first-mentioned situation, viz., the supply of heat to the treatment bath, can be accomplished with the same heating means that is normally used for the initial melting of the salt, using an induction heater, for example. The second requirement, involving removal of heat through cooling of the salt bath, is more difficult to satisfy. It necessitates a heat exchanger and a cooling medium circuit, using water, for example. Such a cooling installation may require large quantities of water, and known installations of this type have been the source of dangerous salt bath explosions, in the event that the heat exchanger, which is immersed in the hot salt bath, suffers a fracture through which large quantities of water can escape into the salt melt. In direct contact with the latter, the water evaporates almost instantaneously, expanding with explosive force.

SUMMARY OF THE INVENTION

Underlying the present invention is the primary objective of providing an improved method for the cooling of a heat treatment bath containing melted salt, into which heat is introduced through the quenching of hot workpieces; and where the removal of heat from the salt bath is accomplished without any accompanying risk of accidental explosions. A further objective of the present invention is aimed at achieving a thorough agitation of the salt bath, in order to equalize the temperature of the latter, while a still further objective concerns itself with the recovery of salt residues from the surfaces of the treated workpieces and with the return of the recovered salt to the salt bath.

The present invention proposes to attain the above objectives by suggesting a novel method for cooling a salt bath through the introduction into the salt bath of partially evaporated water, which, while agitating the bath, removes heat from the latter, as the water is completely evaporated. According to a further novel feature of the invention, the resulting steam is then condensed by transferring heat from it to a secondary cooling medium, whereupon the condensate is used to rinse the treated workpieces, removing from them any adhering salt residue, and returning the recovered salt to the salt bath. Adjustment and maintenance of a predetermined temperature in the treatment bath of melted salt can thus be accomplished by accordingly adjusting the amount of water which is being circulated through the salt bath in the treatment tank.

The method of cooling a salt bath by resorting to evaporative cooling removes from the bath a large amount of heat which is absorbed by a comparatively small amount of water in the form of evaporation energy. The water which is being introduced into the salt bath, is already partially evaporated as it contacts the melted salt, so that the risk of explosive expansion of large amounts of water through sudden evaporation is eliminated, the already evaporated portion of the water acting as an atomizing agent on the remaining water, by turning it into a mist of tiny water droplets.

A further advantage of the present invention flows from a thorough agitation of the melted salt inside the treatment tank, which assures that an even temperature is maintained throughout the salt bath.

Rising from the salt bath inside a circulation pipe, the steam carries with it a certain amount of melted salt which is later separated from the steam, whereupon the steam is cooled and condensed through the transfer of heat to a secondary cooling medium, preferably likewise water. Because this transfer of heat from the primary cooling medium, steam, to the secondary cooling medium, water, takes place at a safe distance from the salt bath, it is not subject to any risk of explosion.

A still further advantage of the present invention resides in the fact that the water which, through evaporation cooling, removes treatment heat from the salt bath while agitating the latter, can also be used to rinse the treated workpieces, for a recovery of any salt residue adhering to the latter, the recovered salt being conveniently returned to the treatment tank by the returning condensate which thus travels in a closed circuit, being again partially evaporated through indirect heat transfer, as it enters the salt bath through a heat exchanger. And because the partial evaporation of the returning water as well as its complete evaporation take place immediately after return of the water to the tank, through contact with the melted salt, the salt which is being carried by the condensate will not be precipitated against the heat exchanger walls as a salt crust. An adjustment of the temperature of such a salt bath can now be made in a most simple manner, by increasing or decreasing the amount of cooling water which is being fed to the treatment tank containing the salt bath.

The device suggested by the present invention includes a heatable treatment tank containing the salt bath. A circulation pipe descends into the salt bath, having intake ports near its lower end and leading from the treatment bath to an expansion tank, from where a return salt pipe runs back to the treatment tank. A steam conduit leads from the expansion tank to a cooled condensation tank, the condensate obtained being fed to at least one collecting and/or rinsing tank for the treated workpieces. From this rinsing station, where the condensate collects salt residues from the treated workpieces, the condensate is pumped back to the treatment tank, through a feed pipe with a flow adjustment valve, the condensate entering the treatment tank through a heat exchanger whose lower end is connected to the intake ports of the circulation pipe.

The novel device of the invention may be so arranged that it also agitates the hot salt bath, thereby eliminating the need for a mechanically driven agitator, using only the circulation of the cooling medium, which is preferably partially evaporated water. This partial evaporation of the water entering the treatment tank is accomplished by the aforementioned heat exchanger, while the evaporation of the remaining water takes place immediately after introduction of the steam-water mixture into the melted salt, thereby removing from the latter that amount of heat which is necessary to evaporate the remaining water. The rising flow of steam carries with it a certain amount of melted salt, the latter being later separated from the steam in an expansion tank located above the treatment vessel. From there, the steam travels to a condensation tank, where that amount of heat which had been removed from the salt bath by the primary cooling medium is again removed from it in a secondary cooling action which turns the steam into condensate. The secondary cooling medium which is being used to achieve condensation is preferably likewise water. The latter, however, does not enter into contact with the melted salt or with the primary cooling medium. The condensed primary cooling medium is now fed into the collecting and rinsing tanks, from where it is pumped back into the treatment tank, as outlined above. The result is a closed circuit for the primary cooling medium which, as it returns to the treatment tank, also conveniently carries back to the tank any salt residue recovered from the workpieces through rinsing of the latter in the rinsing tanks.

The proposed device of the invention also provides a convenient means for adjusting the rate at which the treatment bath is cooled, by simply providing an adjustable flow valve in the feed pipe through which the condensate returns to the treatment tank.

In one of the proposed embodiments of the device of the invention, it is further suggested that the heat exchanger which is mounted inside the treatment tank be in the form of a coil, while in another preferred embodiment of the invention the heat exchanger takes the form of a pipe sleeve enclosing a helical spiral fin in the annular flow space defined between the pipe sleeve and a concentrically arranged central circulation pipe.

Lastly, the invention suggests a convenient way of achieving the desired agitation of the salt bath and a concomitant equilization of the bath temperature, by arranging the salt return pipe between the expansion tank and the treatment tank in such a way that the returning cooled salt enters the tank tangentially along its inside wall, thereby creating a swirling motion of the salt bath.

BRIEF DESCRIPTION OF THE DRAWINGS

Further special features and advantages of the invention will become apparent from the description following below, when taken together with the accompanying drawing which illustrates, by way of example, preferred embodiments of the invention, represented in the various figures as follows:

FIG. 1 shows, in a schematic representation, a device for maintaining an even temperature in a treatment bath, representing an embodiment of the invention; and FIG. 2 illustrates a modification of the embodiment of FIG. 1, featuring a differently designed heat exchanger.

DESCRIPTION OF THE PREFERRED EMBODIMENTS

Referring to FIG. 1 of the drawing, there is shown, in a schematic representation, an installation serving as a device embodying the present invention and which is capable of performing the method of the invention. For this purpose, the device includes a treatment tank 1 which holds a treatment bath of melted salt. In the wall of the treatment tank 1 is mounted a conventional induction heater 2 which is used to initially melt the salt and to later heat the salt bath, in the case where cold workpieces are introduced into the bath, resulting in a lowering of the bath temperature. In order to minimize heat radiation to the surroundings, the treatment tank 1 has an insulation 3 surrounding its walls and the induction heater 2.

Inside the treatment tank 1 is arranged, in a generally upright orientation, a circulation pipe 4 having an open lower end positioned a short distance above the bottom of the treatment tank 1. Not far from the lower end of the circulation pipe 4 are several lateral intake ports 4a in the wall of the circulation pipe 4. The upper end of the circulation pipe 4 leads to an expansion tank 5, located above the treatment tank 1. A return pipe 6 runs from the bottom of the expansion tank 5 back to the treatment tank 1, entering the latter in its upper portion, at a return inlet 6a which is preferably oriented tangentially in relation to the circumference of the treatment tank.

A steam conduit 7 leads from the expansion tank 5 to a condensation tank 8, inside which the steam arriving from the expansion tank 5 is condensed, travelling from there through a condensate pipe 9 to a rinse tank 10. The embodiment of FIG. 1 features three successive rinse tanks 10 connected to one another by means of overflow pipes 10a. The rinsing liquid, after travelling through the successive rinse tanks 10, reaches a feed pump 11 which circulates the cooling medium back to the treatment tank 1, via a feed pipe 12 with a flow adjusting valve 13. At the upper end of the treatment tank 1, the feed pipe 12 communicates with a coil 14 which is submerged in the salt bath inside tank 1 and thus acts as a heat exchanger, heating and partially evaporating the cooling medium as it descends to the lower end of coil 14. There, the incoming coolant flow enters an annular housing 15 surrounding the intake ports 4a of the circulation pipe 4.

To the condensation tank 8 is further connected a cooling stack 18 of conventional design, an intake line 16 with an intake adjustment valve 16a, and an outlet line 17 with an outlet adjustment valve 17a serving for the circulation of a secondary cooling medium, preferably likewise water. The secondary cooling medium thus carries the heat, which it had received from the primary cooling medium in the condensation tank 8, to the cooling stack 18.

In FIG. 2 is illustrated a modification of the device just described, the embodiment of FIG. 2 featuring a heat exchanger which does not utilize a coil 14, as in FIG. 1, but uses a specially designed circulation pipe 4. In the proposed preferred arrangement of FIG. 2, the circulation pipe 4 is concentrically surrounded by a pipe sleeve 19 whose upper extremity emerges from the treatment tank 1 and whose lower extremity surrounds the intake ports 4a near the lower end of the circulation pipe 4. In the annular gap between the circulation pipe 4 and the pipe sleeve 19 is disposed a spiral fin 20 which causes the return flow to travel along a helical path determined by the spiral fin 20, the returning primary cooling medium being thus heated and partially evaporated as it travels downwardly along the spiral fin 20 to the intake ports 4a.

Workpieces, symbolically indicated at 21 in FIG. 1, may be introduced into the treatment bath in steady succession, or at random intervals. In a situation where those workpieces are to be heated through immersion into the salt bath, the necessary heat is being replaced through heating of the treatment tank 1 by means of its induction heater 2. If, on the other hand, the treatment bath is to be cooled, because the workpieces introduced into it lose heat to the bath, such cooling can be accomplished by means of a primary cooling medium which is circulated through the circulation system just described, entering the heat exchanger 14 or 19/20, respectively, through pipe 12, so as to arrive at the intake ports 4a in a partially evaporated state. As the cooling medium enters the upright circulation pipe 4 in the form of a mixture of steam and mostly atomized water droplets, the latter are evaporated inside the circulation pipe 4, as they come in contact with the hot melted salt. Together with it, the now fully evaporated primary cooling medium travels upwardly inside the circulation pipe 4, while additional melted salt enters the pipe 4 from its bottom end. As the descending cooling medium is progressively heated inside the coil 14, or along the helical flow path of the spiral fin 20, it removes a certain amount of heat from the surrounding treatment bath, which heat is being used to partially evaporate the cooling medium. Additional heat is then removed from the melted salt which is carried upwardly by the steam/liquid mixture entering through the ports 4a. Its liquid component is quickly evaporated, the evaporation energy being drawn from the salt which travels with the steam to the expansion tank 5. The removal of heat from the treatment bath in the form of evaporative energy makes it possible to use a comparatively small quantity of water in this process and to accurately adjust the rate of heat removal by adjusting the rate at which water is pumped into the circulation pipe 4.

Because the cooling medium is in a state of partial evaporation, steam being admixed to atomized droplets of water, and because this mixture is fed through the intake ports 4a at a steady rate, the subsequent complete evaporation takes place at a controlled safe rate, as the cooling medium enters the comparatively large vertical circulation pipe 4.

Inside the circulation pipe 4 is now produced a mixture of steam and melted salt, the steam moving upwardly and carrying with it a flow of melted salt, assisted by the pressure of the salt bath against the bottom opening of the circulation pipe 4. The mixture of steam and melted salt, rising through the pipe 4, enters the expansion tank 5, where the steam is separated from the melted salt and the latter returns to the treatment tank 1 through the return pipe 6. Thus, a return flow of cooler melted salt enters the treatment tank 1 at the tangential return inlet 6a, creating a swirling agitation of the salt bath inside the treatment tank 1. The cooled returning flow of salt reduces the temperature of the salt bath, while at the same time equalizing its temperature as a result of the aforementioned agitation.

The steam which had escaped the steam-salt mixture entering the expansion tank 5 now travels through a steam pipe 7 to a condensation tank 8. There, the steam is cooled and condensed, thereby removing from it that heat which the steam had previously removed from the treatment bath of tank 1. This is accomplished by means of a secondary cooling medium, preferably likewise water, which, however, is never in contact with the salt of the treatment bath, either directly or indirectly. An intake line 16 and an outlet line 17 connect the heat exchanger of the condensation tank 8 with a cooling stack 18. The latter may be of conventional design, removing the heat from the secondary cooling medium in an open or closed flow circuit.

The condensate which is obtained in the condensation tank 8 flows from there, through a condensate pipe 9, to the first one of three rinse tanks 10 inside which the treated workpieces 1 are rinsed, thereby removing any salt residue that might have adhered to their surfaces. This rinsing operation offers a dual benefit, inasmuch as the workpieces 1 are cleaned and the salt residues removed are conveniently recovered by the cooling medium, which returns them to the treatment tank.

The return flow of the primary cooling medium, containing the recovered salt residues, to the treatment tank takes place through a feed pipe 12, with a feed pump 11 and a flow adjusting valve 13 controlling the rate of return flow. The recovered salt is returned to the salt bath, as the cooling medium enters the circulation pipe 4 at the intake ports 4a. The primary cooling medium thus travels in a closed circuit. And because the coil 14 (FIG. 1) and the pipe sleeve 19 (FIG. 2) are both heated by the surrounding salt bath, there is no risk that the returning salt residue may lead to salt deposits in the form of hard salt crusts on the heat exchanger surfaces, because the temperature of these walls is at all times higher than the melting temperature of the salt. As mentioned earlier, the temperature of the melted salt in the treatment bath can be raised or lowered in a most simple manner, by reducing or increasing the rate of flow in the closed circuit of the primary cooling medium. This is done by adjusting the flow valve 13 of the feed pipe 12.

The introduction of the cooling medium into the treatment bath in a partially evaporated state, following its downward travel through a heat exchanger, thus removes heat from the melted salt first indirectly, through the walls of the coil 14 or alternatively, through the walls of the pipe sleeve 19, and secondly, through direct contact between the partially evaporated cooling medium and the melted salt inside the circulation pipe 4, where, as a result of this contact, the cooling medium is completely evaporated and the salt travelling upwardly with it is cooled accordingly. This circulation of the melted salt with the cooling medium provides a very desirable agitation of the treatment bath, as the returning cooled salt flow creates a swirling motion in the salt bath, thereby not only lowering the temperature of the bath to the desired level, but also equalizing it continuously.

The fact that the cooling method of the present invention relies on the principle of evaporative cooling makes it possible to use a comparatively small amount of water as primary cooling medium. This constitutes an important safety factor, because it assures, even in the case of accidental failure of a heat exchanger wall, that the amount of water then directly entering the treatment bath would not be large enough to lead to an explosion. Lastly, the use of water as a primary cooling medium and as a vehicle for the agitation and circulation of the melted salt is not only most economical and safe, it also offers the additional advantage of serving as a rinsing medium for the treated workpieces, as it removes and recovers salt residues from the latter and returns the recovered salt to the treatment bath.

It should be understood, of course, that the foregoing disclosure describes only preferred embodiments of the invention and a preferred method of performing the latter and that it is intended to cover all changes and modifications of these examples of the invention which fall within the scope of the appended claims.

I claim the following:

1. A method of cooling a treatment bath of melted salt into which heat is being introduced by the work or substance which is being treated therein, as when hot workpieces are quenched, for example, the salt bath cooling method comprising the steps of:

using a primary cooling medium a liquid whose boiling point lies substantially below the operating temperature of the salt bath;

heating said liquid primary cooling medium to a state of partial evaporation, so as to create a mixture of liquid and vapor;

introducing said liquid and vapor mixture into the salt bath, in direct contact therewith, thereby evaporating the remaining liquid portion of the cooling medium through direct heat transfer from the melted salt to the cooling medium, with the previously evaporated portion of said cooling medium acting as an atomizing agent on the liquid portion of the cooling medium, thus controlling its expansion during evaporation; and agitating the treatment bath by utilizing the expansion forces acting on the completely evaporating cooling medium to entrain a portion of the melted salt in a circulatory flow.

2. A salt bath cooling method as defined in claim 1, comprising the additional steps of:

separating the evaporated primary cooling medium from said circulatory flow of cooling medium and melted salt;

cooling and condensing the primary cooling medium by means of a secondary cooling medium;

rinsing previously treated workpieces with the condensed cooling medium so as to remove therefrom any salt residue; and returning the cooling medium and salt residue to the treatment bath, by repeating the steps of heating it and introducing it into the salt bath, the former step being performed through indirect transfer of heat from the melted salt to the cooling medium in a heat exchanger.

3. A salt bath cooling method as defined in claim 2, wherein the liquid primary cooling medium is water.

4. A salt bath cooling method as defined in claim 1, wherein the step of agitating the treatment bath involves the additional steps of guiding said circulatory flow of evaporated cooling medium and melted salt upwardly out of the salt bath by means of a conduit which reaches into the salt bath from above;

separating from said circulatory flow the evaporated cooling medium; and returning the remaining cooled salt to the salt bath in a return flow which enters the salt bath in a direction which creates agitation within the salt bath while cooling it.

5. A salt bath cooling method as defined in claim 1, wherein the step of introducing the cooling medium into the salt bath involves the additional steps of:

pumping the cooling medium into the salt bath; and adjustably controlling the flow rate of the cooling medium, as a function of the desired treatment bath temperature.

* * * * *